(12) United States Patent
Karlak

(10) Patent No.: US 10,724,625 B2
(45) Date of Patent: Jul. 28, 2020

(54) TORSIONALLY COMPLIANT GEARTRAIN CARRIER ASSEMBLY

(71) Applicant: Sikorsky Aircraft Corporation, Stratford, CT (US)

(72) Inventor: Matthew J. Karlak, Plymouth, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 19 days.

(21) Appl. No.: 15/900,490

(22) Filed: Feb. 20, 2018

(65) Prior Publication Data
US 2019/0257410 A1   Aug. 22, 2019

(51) Int. Cl.
| | | |
|---|---|---|
| F16H 1/28 | (2006.01) | |
| F16H 57/08 | (2006.01) | |
| B64C 27/14 | (2006.01) | |
| F16H 57/12 | (2006.01) | |
| F16H 57/021 | (2012.01) | |
| F16H 57/04 | (2010.01) | |

(52) U.S. Cl.
CPC ........... *F16H 57/082* (2013.01); *B64C 27/14* (2013.01); *F16H 1/28* (2013.01); *F16H 57/021* (2013.01); *F16H 57/0482* (2013.01); *F16H 57/12* (2013.01); *F16H 2057/085* (2013.01); *F16H 2057/126* (2013.01)

(58) Field of Classification Search
CPC .... F16H 57/082; F16H 1/28; F16H 2057/126; F16H 57/12; F16H 57/0482; F16H 57/021; F16H 2057/085; B64C 27/14

USPC ................. 475/331, 347, 348, 346
See application file for complete search history.

(56) References Cited

U.S. PATENT DOCUMENTS

| | | | | |
|---|---|---|---|---|
| 3,943,787 A | * | 3/1976 | Hicks | F16H 1/2836 74/410 |
| 4,524,643 A | * | 6/1985 | Ziegler | F16H 1/2836 475/345 |
| 5,145,471 A | | 9/1992 | Meier-Burkamp | |
| 5,336,137 A | * | 8/1994 | Kawakita | B60N 2/2251 297/362 |
| 5,368,528 A | * | 11/1994 | Farrell | F16C 19/48 384/424 |
| 5,558,594 A | * | 9/1996 | Lefranc | F16H 1/2836 475/347 |
| 5,593,362 A | * | 1/1997 | Mizuta | F16H 57/082 475/348 |
| 6,592,490 B2 | * | 7/2003 | Olson | F16C 19/46 384/112 |
| 6,902,508 B2 | | 6/2005 | Stille et al. | |
| 8,647,229 B2 | | 2/2014 | Ai et al. | |
| 2002/0022545 A1 | * | 2/2002 | Shattuck | F16H 57/082 475/331 |

(Continued)

*Primary Examiner* — Roger L Pang
(74) *Attorney, Agent, or Firm* — Cantor Colburn LLP

(57) ABSTRACT

A gearbox assembly having a driven assembly includes a drive hub having gear posts, the drive hub being rotatable about an axis. The gearbox assembly additionally includes a plurality of planetary gears and an intermediate component coupling one of the plurality of planetary gears to a corresponding gear post. The intermediate component has sufficient flexibility to maintain the planetary gears in meshing engagement with the driven assembly within the gearbox assembly when one of the planetary gears is misaligned with the corresponding gear post.

8 Claims, 7 Drawing Sheets

(56) References Cited

U.S. PATENT DOCUMENTS

| | | | |
|---|---|---|---|
| 2003/0008748 A1* | 1/2003 | Fox | F16C 19/386 |
| | | | 475/346 |
| 2005/0143215 A1* | 6/2005 | Fugel | F16C 33/6677 |
| | | | 475/331 |
| 2010/0197444 A1* | 8/2010 | Montestruc | F16H 1/2836 |
| | | | 475/331 |
| 2011/0039654 A1* | 2/2011 | Fox | F16C 35/063 |
| | | | 475/346 |
| 2017/0234421 A1* | 8/2017 | Poster | F16H 57/08 |
| | | | 475/331 |

* cited by examiner

TORSIONALLY COMPLIANT GEARTRAIN CARRIER ASSEMBLY

STATEMENT OF FEDERAL SUPPORT

This invention was made with government support under W911W6-13-2-0003 awarded by the Army. The government has certain rights in the invention.

BACKGROUND

Exemplary embodiments of the disclosure generally relate to a rotary wing aircraft, and more particularly, to a transmission system for a rotor system of a rotary wing aircraft.

In a typical rotorcraft or propeller driven aircraft, a transmission system transfers power from an engine to a rotor or propeller of the aircraft. Since the rotational velocity of the rotor or propeller is significantly lower than the rotational velocity of the engine, the engine rotational velocity must be reduced by the transmission system. Many conventional transmission systems include a number of gear stages for reducing the rotational speed before the final rotational output is provided to the rotor. However, these systems are substantial in not only size, but also complexity. Typically, this is due to the final gears which, although effective, are relatively large and heavy. Further, when the transmission is operated at high rotational velocities, a large centrifugal load is created that causes movement of the planetary gears toward the ring gear of a planetary gear system.

BRIEF DESCRIPTION

According to an embodiment, a gearbox assembly having a driven assembly includes a drive hub having gear posts, the drive hub being rotatable about an axis. The gearbox assembly additionally includes a plurality of planetary gears and an intermediate component coupling one of the plurality of planetary gears to a corresponding gear post. The intermediate component has sufficient flexibility to maintain the planetary gears in meshing engagement with the driven assembly within the gearbox assembly when one of the planetary gears is misaligned with the corresponding gear post.

In addition to one or more of the features described above, or as an alternative, in further embodiments the plurality of planetary gears receive an input torque and transmits an output torque to the drive hub.

In addition to one or more of the features described above, or as an alternative, in further embodiments plurality of planetary gears are mounted to the gear posts such that the planetary gears are rotatable about the axis and rotatable about another axis defined by the gear posts.

In addition to one or more of the features described above, or as an alternative, in further embodiments the intermediate component includes a bearing.

In addition to one or more of the features described above, or as an alternative, in further embodiments comprising a liner positioned between an outer surface of one of the gear posts and the bearing.

In addition to one or more of the features described above, or as an alternative, in further embodiments comprising a reinforcement plate positioned in contact with a side of one of the plurality of planetary gears.

In addition to one or more of the features described above, or as an alternative, in further embodiments the reinforcement plate includes an opening and a distal end of one of the gear posts extends through the opening.

In addition to one or more of the features described above, or as an alternative, in further embodiments the reinforcement plate further includes a contoured region extending between an inner surface of one of the gear posts and an outer surface of one of the gear posts, wherein the opening is formed in the contoured region.

In addition to one or more of the features described above, or as an alternative, in further embodiments comprising a nut connectable to the distal end of one of the gear posts to couple the reinforcement plate to one of the gear posts.

In addition to one or more of the features described above, or as an alternative, in further embodiments the gearbox assembly is part of a propulsor gearbox for a translational thrust system.

According to another embodiment, a gearbox assembly including a planetary gear assembly including a sun gear, a ring gear, and at least one planetary gear. A drive hub includes at least one gear post supporting the at least one planetary gear. The at least one planetary gear is arranged in meshing engagement within the sun gear and the ring gear when the at least one planetary gear and the at least one gear post are misaligned.

In addition to one or more of the features described above, or as an alternative, in further embodiments the at least one drive post is fixed relative to the drive hub.

In addition to one or more of the features described above, or as an alternative, in further embodiments the at least one planetary gear includes a plurality of identical planetary gears.

In addition to one or more of the features described above, or as an alternative, in further embodiments the at least one planetary gear is coupled to the drive hub with a bearing.

In addition to one or more of the features described above, or as an alternative, in further embodiments the at least one gear is rotatable about a first axis defined by the sun gear and a second axis defined by the bearing.

In addition to one or more of the features described above, or as an alternative, in further embodiments comprising a reinforcement plate mounted to the at least one planetary gear to oppose centrifugal forces acting on the at least one planetary gear.

In addition to one or more of the features described above, or as an alternative, in further embodiments comprising a lubrication system for distributing a lubricant to the planetary gear assembly.

In addition to one or more of the features described above, or as an alternative, in further embodiments lubricant is distributed from the lubrication system to the planetary gear assembly in response to a centrifugal force acting on the lubrication system and the gearbox assembly.

In addition to one or more of the features described above, or as an alternative, in further embodiments the sun gear is coupled to an input shaft and the drive hub is connected to an output shaft, a rotational speed of the input shaft is greater than a rotational speed of the output shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
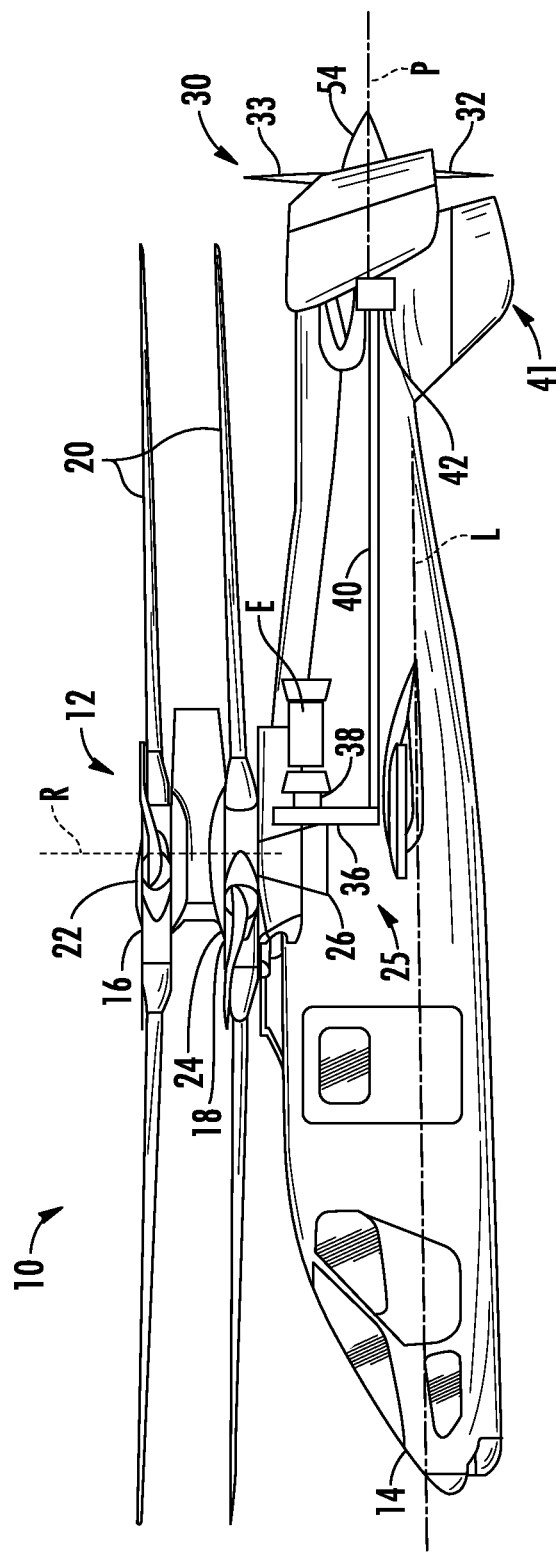
FIG. 1 is a general side view of an example of a rotary wing aircraft according to an embodiment.

With reference now to FIG. 1, an example of a vertical takeoff and landing (VTOL) aircraft 10 is shown. In the illustrated, non-limiting embodiment, the aircraft is a high speed compound or coaxial contra-rotating rigid rotor aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively. The main rotor system 12 is driven by a transmission 25. The translational thrust system 30 may be any propeller system including, but not limited to a pusher propeller, a tractor propeller, a nacelle mounted propeller, etc. In the example of FIG. 1, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed flight. The translational thrust system 30 may be driven through a main gearbox 26 which also drives the main rotor system 12.

The transmission 25 includes a main gearbox 26 driven by one or more engines, illustrated schematically at E. The main gearbox 26 and engines E are considered as part of the non-rotating frame of the aircraft 10. In the case of a rotary wing aircraft, the main gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

The transmission 25 may also include a combiner gearbox 36 in meshing engagement with the main gearbox 26 and driven by one or more engines E. The engines E may drive the combiner gearbox 36 and the main gearbox 26 through a disconnecting mechanism, such as an overrunning clutch 38. The translational thrust system 30 can include a drive shaft 40 which is driven by the combiner gearbox 36 to drive the auxiliary propulsor 32 through an auxiliary propulsor gearbox 42. It should be understood that although the combiner gearbox 36 is schematically illustrated as a separate component, the combiner gearbox 36 may alternatively be incorporated directly into the main gearbox 26. In the example of FIG. 1, the propulsor 32 includes a plurality of propeller blades 33 extending from a propeller hub 54 and is positioned at a tail section 41 of the aircraft 10. The propulsor gearbox 42 is likewise located at the tail section 41, in some embodiments to achieve a desired Cg of the aircraft 10.

Figure 2:
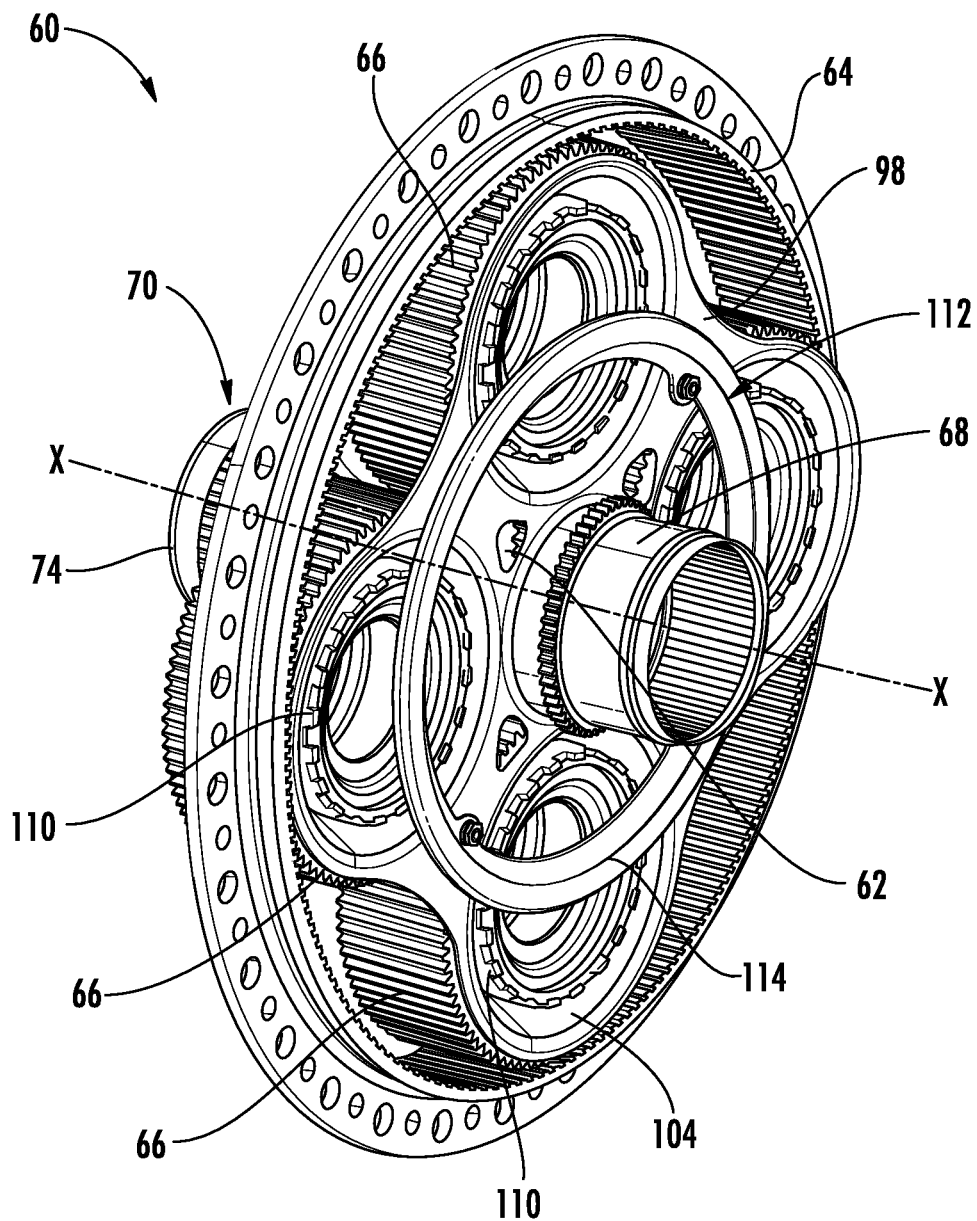
FIG. 2 is a perspective view of an epicyclic geartrain of a rotary wing aircraft according to an embodiment.

Referring now to FIG. 2, a gearbox assembly 60 suitable for use in the transmission 25 is illustrated in more detail. In an embodiment, the gearbox assembly is operable as the auxiliary propulsor gearbox 42 of the transmission 25. However, it should be understood, that the gearbox assembly 60 illustrated and described herein may be used in any of the gearboxes of the aircraft 10. In the illustrated, non-limiting embodiment, the gearbox assembly 60 includes a single stage planetary gear train including a sun gear 62, an outer ring gear 64, and a plurality of planetary gears 66 arranged in meshing engagement with both the sun gear 62 and the outer ring gear 64. In the illustrated, non-limiting embodiment, the assembly 60 includes four planetary gears 66; however, it should be understood that any number of planetary gears 66 is contemplated herein.

Figure 3:
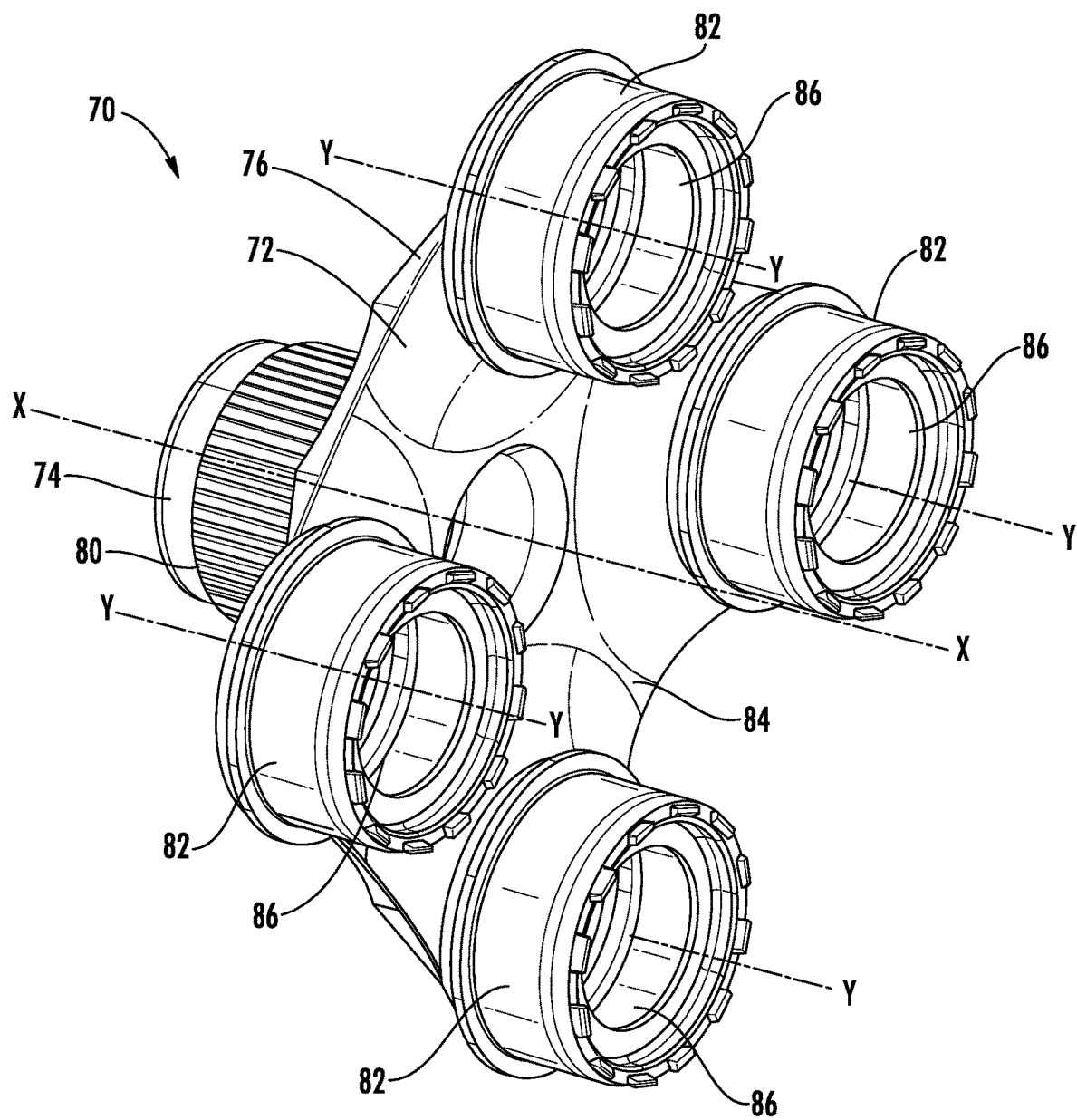
FIG. 3 is a perspective view of a planetary carrier of the epicyclic geartrain of FIG. 2 according to an embodiment.
Figure 4:
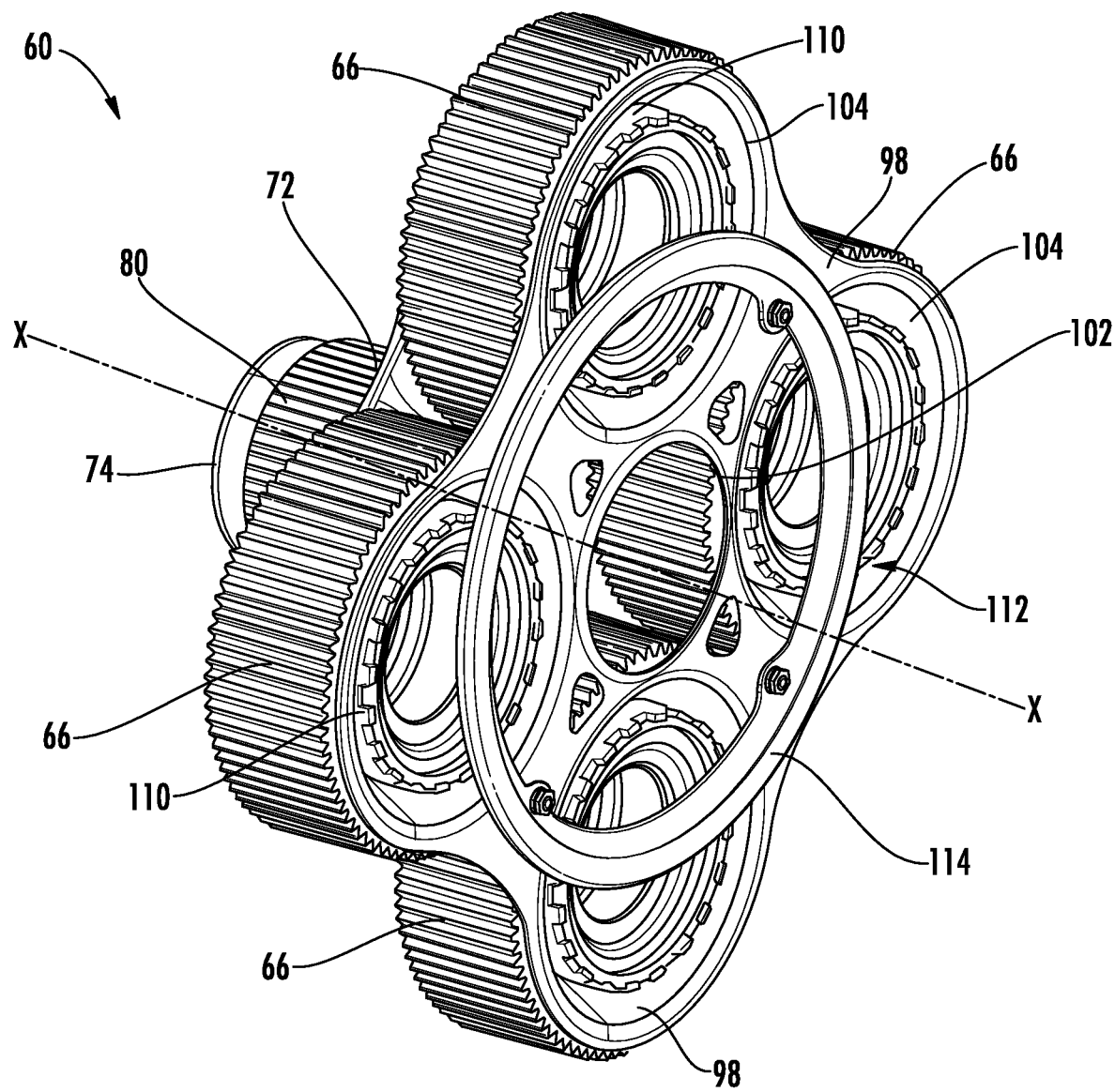
FIG. 4 is a perspective view of a portion of the epicyclic geartrain of FIG. 2 according to an embodiment.

The sun gear 62 is connected to an input shaft 68 which defines the axis of rotation X of the sun gear 62. Each of the plurality of planetary gears 66 is located radially about the sun gear 62 and is coupled to a movable carrier frame or drive hub 70 (see FIG. 3). The drive hub 70 includes a base plate 72 and a connector 74 extending from a first side 76 of the base plate 72. The connector 74 is also aligned with the longitudinal axis X, which defines an axis of rotation of the drive hub 70. An output shaft 78 (see FIG. 6), such as for driving rotation of the propulsor 32 about axis P for example, is configured to couple to the connector 74 extending from a first side 76 of the base plate 72. The connector 74 may include a plurality of splines 80, as shown in FIGS. 3 and 4, configured to cooperate with one or more splines (not shown) formed in the output shaft 78 to restrict relative rotation between the connector 74 of the drive hub 70 and the output shaft 78. In the illustrated, non-limiting embodiment, the output shaft 78 and the input shaft 68 are arranged coaxially such that each of the input shaft 68, sun gear 62, drive hub 70 rotates about the longitudinal axis X.

As the input shaft 68 and the sun gear 62 rotate about the axis X, a torque is transmitted from the sun gear 62 to the planetary gears 66 and the coupled drive hub 70. The torque applied to the planetary gears 66 causes each of the planetary gears 66 to rotate about a respective axis Y. Because of the engagement of the planetary gears 66 with the outer ring gear 64, the rotation of each planetary gear 66 about its respective axis Y causes the planetary gears 66 to additionally rotate about the longitudinal axis X about the inner periphery of the outer ring gear 64. As the planetary gears 66 revolve about the outer ring gear 64, the drive hub 70 similarly rotates about longitudinal axis X, thereby causing an output shaft 78 coupled to the drive hub 70 to rotate coaxially with the input shaft 68 about the longitudinal axis X.

With reference now to FIGS. 3-7, the interface between each of the plurality of planetary gears 66 and the drive hub 70 is illustrated in more detail. As shown, a plurality of gear posts 82 extends from a second side 84 of the base plate 72, toward the input shaft 68. The total number of gear posts 82 is equal to the total number of planetary gears 66 in the assembly 60. Further, in an embodiment, each of the plurality of gear posts 82 is substantially identical. As shown, each gear post 82 is generally cylindrical in shape and has a hollow interior 86 to reduce the total material, and therefore the weight, of each gear post 82. Further, the hollow interior 86 provides a lubricant flow path to be described in more detail below.

The gear posts 82 are illustrated as being equidistantly spaced near a perimeter of the base plate 72. For example, the base plate 72 is shown as being generally rectangular or square in shape and a corresponding gear post 82 is located at each corner of the base plate 72. However, in other embodiments, the plurality of gear posts 82 may be positioned between adjacent corners of the base plate 72 for example. Accordingly, a base plate 72 having any shape and any configuration of the plurality of gear posts 82 that defines a clearance for receiving the sun gear 62 is considered within the scope of the disclosure. In addition, the gear posts 82 may be fixedly mounted to the second side 84 of the base plate 72, or alternatively, may be integrally formed with the base plate 72.

Figure 6:
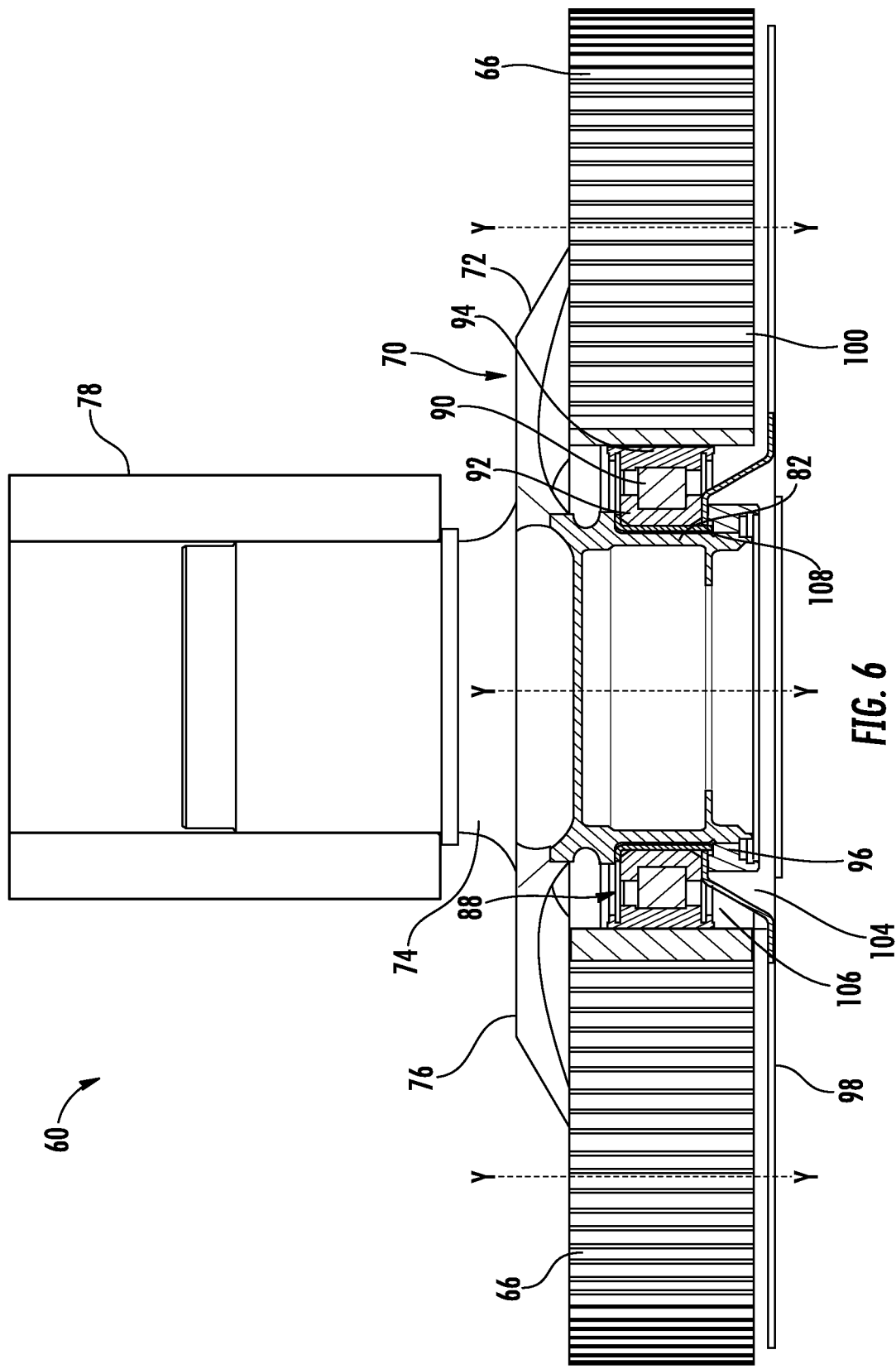
FIG. 6 is a cross-sectional view of a portion of the epicyclic geartrain of FIG. 2 according to an embodiment.
Figure 7:
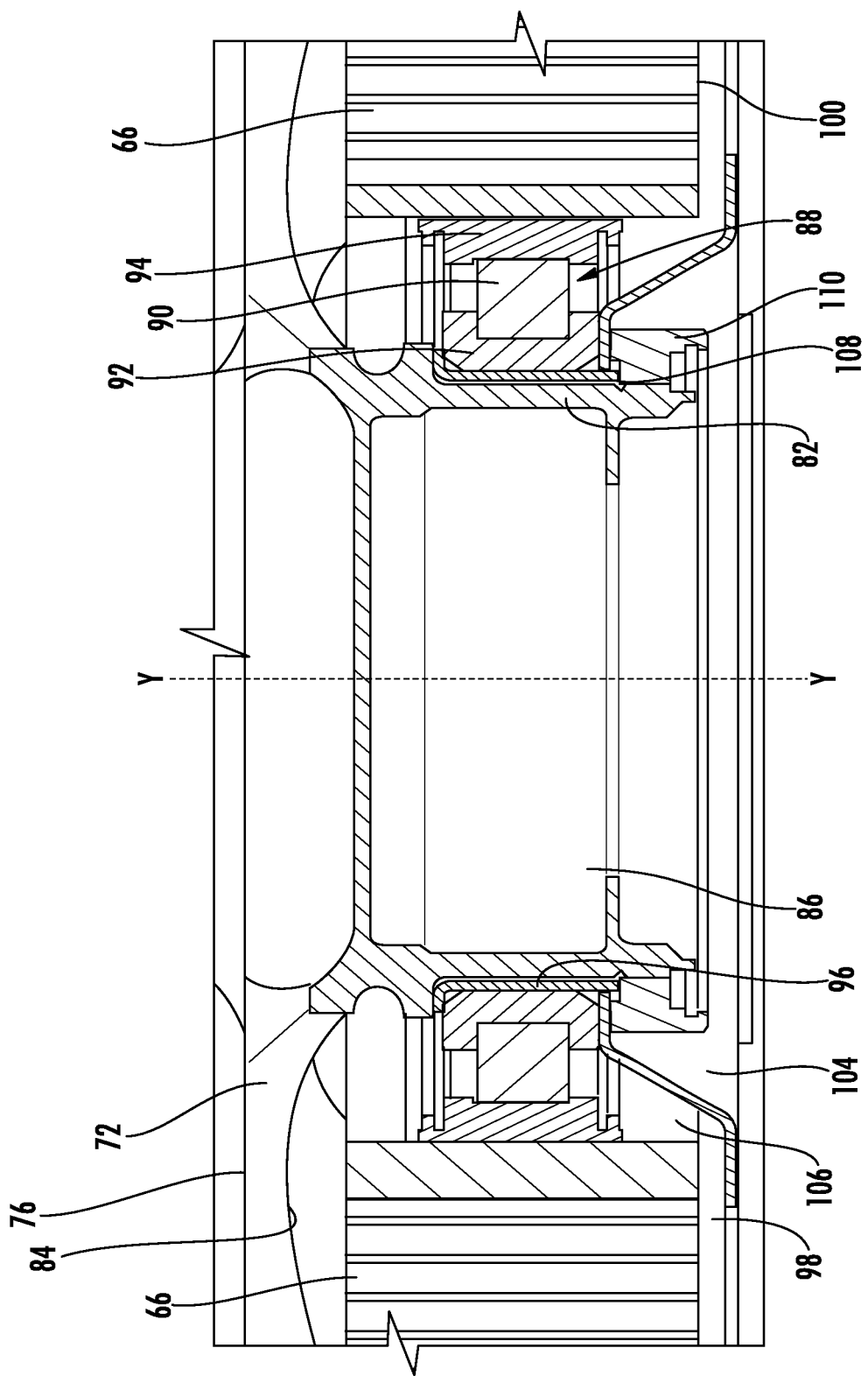
FIG. 7 is a detailed view of FIG. 6 according to an embodiment.

A bearing 88 is positioned in overlapping arrangement with a central portion of each gear post 82. In the illustrated, non-limiting embodiment, the bearing 88 includes a plurality of roller elements 90 disposed between an inner race 92 affixed to the gear post 82 and an outer race 94. It should be understood that any suitable type of bearing 88 that allows the outer race 94 to rotate relative to the inner race 92 is contemplated herein. Accordingly, each bearing 88 defines the rotational axis Y of each individual planetary gear 66 within the gearbox assembly 60. As best shown in FIGS. 6-7, a liner 96 may be wrapped about the periphery of a central portion of each gear post 82 at a position between the bearing 88 and a surface of the gear post 82. In an embodiment, the size of the liner 96 corresponds to the size of the inner race 92, and therefore does not extend over the full height of the gear post 82. The liner 96 may be formed from any suitable material and may prevent movement of the bearing inner race 92 relative to the gear post 82.

A planetary gear 66 is mounted concentrically with the outer race 94 of each bearing 88. As a result, the planetary gear 66 is configured to rotate with the outer race 94 of the bearing 88 about the rotational axis Y. The bearing 88 is configured to tolerate a misalignment between the planetary gear 66 and the gear post 82.

Figure 5:
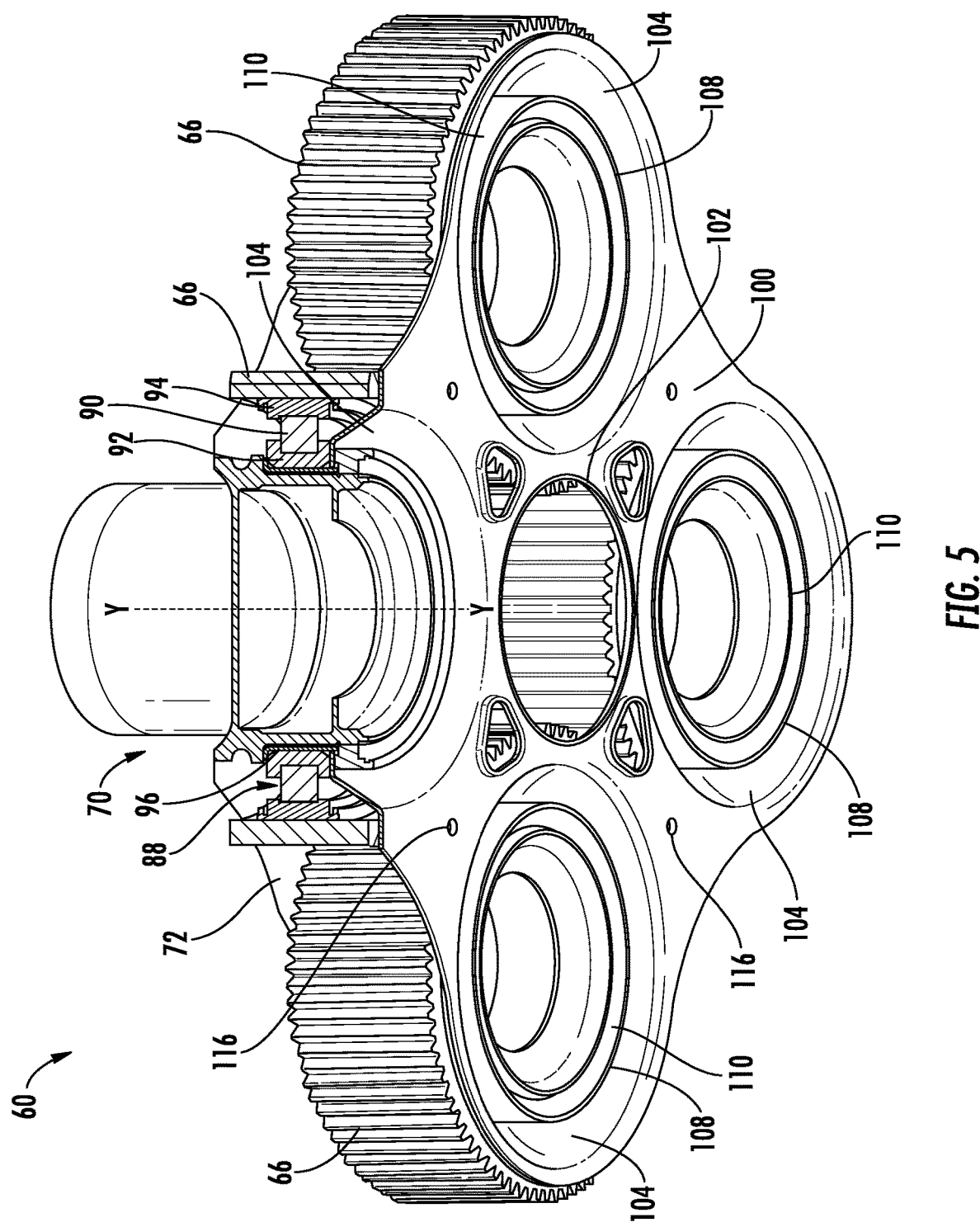
FIG. 5 is a perspective, partial cross-sectional view of a portion of the epicyclic geartrain of FIG. 2 according to an embodiment.

As best shown in FIG. 5, a lightweight reinforcement plate 98 is positioned in overlapping arrangement with a first end 100 of each of the plurality of planetary gears 66. The reinforcement plate 98 is typically affixed with one or more fasteners to the planetary gears 66. As shown, the reinforcement plate 98 includes a central opening 102 through which the sun gear 62 and the input shaft 68 are received. The reinforcement plate 98 additionally includes a contoured region 104 associated with each of the plurality of planetary gears 66. The contoured region 104 extends out of the plane defined by a first side 100 of the planetary gears 66 and into the cavity 106 formed between an inner surface of the planetary gear 66 and an outer surface of the gear post 82. In an embodiment, the contoured region 104 may abut a surface of the inner race 92 of the bearing 88.

An opening 108 is formed in each contoured region 104 of the reinforcement plate 98 such that when the reinforcement plate 98 is mounted to the plurality of planetary gears 66, the distal end of each gear post 82 extends through a corresponding opening 108. A nut 110 is coupled to the distal end of each gear post 82 to restrict movement of the reinforcement plate 98 from the gearbox assembly 60. In an embodiment, the reinforcement plate 98 is sandwiched between the inner race 92 of the bearing 88 and the nut 110.

In an embodiment, the gearbox assembly 60 may further includes a lubrication system 112 for distributing lubricant, such as oil for example, to the plurality of gears. As shown, the lubrication system 112 includes a ring 114 disposed in fluid communication with one or more openings 116 formed in the reinforcement plate 98. As the drive hub 70 rotates about the axis X, the centrifugal forces acting on the gearbox assembly 60 pump lubricant through the reinforcement plate 98 to the plurality of gears 62, 64, 66.

The base plate 72 is designed for flexibility to allow the gears to find their proper meshing point. By supporting each planetary gear 66 using a bearing 88, the planetary gears 66 are able to twist, flex, or float relative to the drive hub 70 to achieve a relative slope between a planetary gear 66 and a corresponding gear post 82. As a result of this movement, the ability of the planetary gears 66 to achieve proper positioning and maintain meshing alignment with both the sun gear 62 and the ring gear 64 is enhanced. Accordingly, the gearbox assembly 60 described herein allows for a degree of torsional flexibility not typically possible at high speeds. Further, the reinforcement plate 98 counteracts the centrifugal forces acting on the planetary gears 66, thereby allowing the gearbox assembly 60 to be operated at higher speeds than what would be possible without the reinforcing plate 98, given the required flexibility of the base plate 72 to enable torsional compliance.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gearbox assembly having a driven assembly, the gearbox assembly comprising:
   a drive hub having a flexible base plate and a plurality of gear posts, the drive hub being rotatable about an axis;
   a plurality of planetary gears;
   at least one bearing coupling one of the plurality of planetary gears to a corresponding gear post, the at least one bearing being operable to maintain the planetary gears in meshing engagement with the driven assembly within the gearbox assembly when one of the plurality of planetary gears is misaligned with the corresponding gear post; and a reinforcement plate positioned in contact with a side of the at least one bearing, the reinforcement plate including a contoured region received radially inward and axially aligned with of each of the plurality of planetary gears, wherein the contoured region abuts a portion of the at least one bearing.

2. The gearbox assembly of claim 1, wherein the plurality of planetary gears receive an input torque and transmits an output torque to the drive hub.

3. The gearbox assembly of claim 1, wherein the plurality of planetary gears are mounted to the gear posts such that the planetary gears are rotatable about the axis and rotatable about another axis defined by the gear posts.

4. The gearbox assembly of claim 1, further comprising a liner positioned between an outer surface of one of the gear posts and the bearing.

5. The gearbox assembly of claim 1, wherein the reinforcement plate includes an opening and a distal end of one of the gear posts extends through the opening.

6. The gearbox assembly of claim 5, wherein the contoured region extends between an inner surface of one of the gear posts and an outer surface of one of the gear posts, wherein the opening is formed in the contoured region.

7. The gearbox assembly of claim 5, further comprising a nut connectable to the distal end of one of the gear posts to couple the reinforcement plate to one of the gear posts.

8. The gearbox assembly of claim 1, wherein the gearbox assembly is part of a propulsor gearbox for a translational thrust system.

\* \* \* \* \*